United States Patent
Kanagarajan et al.

(10) Patent No.: US 10,930,163 B2
(45) Date of Patent: Feb. 23, 2021

(54) SYSTEMS AND METHODS FOR VALIDATING REAL-TIME CONDITION OF A LANDING FIELD USING AIRCRAFT DATA

(71) Applicant: Honeywell International Inc., Morris Plains, NJ (US)

(72) Inventors: Sivakumar Kanagarajan, TamilNadu (IN); David B. Goldstein, Washington, NJ (US)

(73) Assignee: Honeywell International Inc., Charlotte, NC (US)

(*) Notice: Subject to any disclaimer, the term of this patent is extended or adjusted under 35 U.S.C. 154(b) by 268 days.

(21) Appl. No.: 16/026,949

(22) Filed: Jul. 3, 2018

(65) Prior Publication Data

US 2020/0013297 A1 Jan. 9, 2020

(51) Int. Cl.
| | |
|---|---|
| *B60T 8/17* | (2006.01) |
| *B60T 8/171* | (2006.01) |
| *B60T 8/172* | (2006.01) |
| *B07C 5/08* | (2006.01) |
| *G08G 5/00* | (2006.01) |
| *G08G 5/02* | (2006.01) |
| *G07C 5/08* | (2006.01) |

(52) U.S. Cl.
CPC ............ *G08G 5/0086* (2013.01); *B60T 8/171* (2013.01); *B60T 8/1703* (2013.01); *G07C 5/085* (2013.01); *G07C 5/0816* (2013.01); *G08G 5/0013* (2013.01)

(58) Field of Classification Search
CPC ........ B60T 8/1703; B60T 8/171; B60T 8/172; G07C 5/085; G07C 5/0816; G08G 5/0086; G08G 5/0013
USPC .......................................................... 701/70
See application file for complete search history.

(56) References Cited

U.S. PATENT DOCUMENTS

| | | | |
|---|---|---|---|
| 6,606,035 B2 | 8/2003 | Kapadia et al. | |
| 2009/0125169 A1 | 5/2009 | Edwards et al. | |
| 2009/0292433 A1* | 11/2009 | Goodman | B60T 8/1703 701/70 |
| 2009/0292483 A1* | 11/2009 | Journade | G08G 5/065 702/33 |
| 2010/0125382 A1* | 5/2010 | Wachenheim | G05B 19/416 701/18 |
| 2012/0215388 A1* | 8/2012 | Pepitone | G08G 5/025 701/14 |

(Continued)

*Primary Examiner* — Behrang Badii
*Assistant Examiner* — Hossam M Abd El Latif
(74) *Attorney, Agent, or Firm* — Bookoff McAndrews, PLLC

(57) ABSTRACT

Computer-implemented methods for validating a real-time condition of a landing field using aircraft data. One method comprises identifying a plurality of segments of the runway based on a configurable parameter; receiving input data of at least one of a reported runway condition code and a reported braking action of a recently landed aircraft; receiving actual data of an actual runway deceleration profile from the recently landed aircraft for each identified segment of the runway; creating expected data of an expected runway deceleration profile based on the received input data and the received actual data; comparing the received actual data with the created expected data to validate and/or reassess the input data; and transmitting the validated and/or reassessed data to at least one of other approaching aircraft and an airport controller.

20 Claims, 4 Drawing Sheets

(56) References Cited

U.S. PATENT DOCUMENTS

| | | | |
|---|---|---|---|
| 2015/0254990 A1* | 9/2015 | Raby | G08G 5/0086 |
| | | | 701/16 |
| 2016/0362093 A1* | 12/2016 | Gadzinski | G08G 5/025 |
| 2017/0061806 A1* | 3/2017 | Daveau | G08G 5/065 |
| 2019/0049287 A1* | 2/2019 | Nance | B64D 45/00 |

* cited by examiner

SYSTEMS AND METHODS FOR VALIDATING REAL-TIME CONDITION OF A LANDING FIELD USING AIRCRAFT DATA

TECHNICAL FIELD

The present disclosure relates to methods and systems for validating a real-time condition of a landing field using aircraft data. More particularly, the present disclosure relates to methods and systems for real-time validation and, if needed, reassessment of a runway condition code and a braking action by analyzing landing data from a recently landed aircraft.

BACKGROUND

A significant proportion of aircraft accidents and incidents arise from runway overrun and veer-off events (collectively referred herein to as "runway excursions"). Runway excursions occur when the flight crew is unable to stop an aircraft within the available runway length. This may result from a lack of runway length available after touchdown, a delayed action by the flight crew in the use of braking devices to decelerate the aircraft, or a difference of actual runway condition from the reported runway condition code (RWYCC) due to delay in reporting and/or subjective reporting standards (e.g., the RWYCC is "good/normal," but the runway is actually covered in ice).

The presence of liquid contaminants (e.g., liquid water, snow, slush, ice, oil, and the like) or solid contaminants (e.g., rubber deposits from aircraft tires) on the runway surface can greatly reduce the braking friction coefficient and thus adversely affect the aircraft braking performance. For example, the rollout distance required for a commercial aircraft to reach full stop on a wet runway surface can be more than twice the distance required by the aircraft to stop on the same runway when dry. The most common factor in runway excursion events is that the flight crew is unaware of the exact condition of the runway in real-time. As such, it is important for the aircrew to gain prior knowledge of the accurate and real-time condition of a runway prior to takeoff from or landing at the runway.

In order to better provide actual runway conditions to pilots, the Federal Aviation Administration (FAA) published a Safety Alert for Operators ("SAFO") regarding the runway assessment and condition reporting standards. In the SAFO, the FAA implemented the use of a standardized Runway Condition Assessment Matrix ("RCAM") to be used by airport controllers to perform assessments of runway conditions and by pilots to interpret the reported runway conditions. The RCAM is based on airplane performance data supplied by airplane manufacturers for each of the stated contaminant types and depths. The SAFO was intended to replace the subjective judgments of runway surface conditions with more objective assessments.

In the new and current system of reporting runway conditions, airport controllers use the RCAM to objectively assess paved runway surfaces, report contaminants present, and determine a numerical runway condition code (RWYCC) based on a table provided in the RCAM. Further, a pilot may report, by a pilot information report (PIREP), his/her actual braking action while landing. For example, if the braking deceleration is normal for the wheel braking effort applied and the directional control is normal, the pilot would report the braking action to be "Good." Although the RWYCC and PIREPS from pilots that have already landed are available to arriving pilots in advance, they provide only a qualitative representation of the runway condition and do not suggest accurate or specific actions to be taken while landing by the other arriving pilots, due to the following factors:

a. The PIREP reported by the crew who experienced the braking action during the landing may be constrained from his/her experience and personal factors.
b. The PIREPS are not mandatory and are merely recommended by the FAA, so not all pilots report their braking action.
c. The friction measurement equipment used by the airport controller may have inaccuracies and if the conditions change immediately, the current RWYCC may be inaccurate.
d. The RWYCC is for the entire length of the runway in general and not for specific areas of the runway (i.e., the runway condition may be different at different areas of the runway).

The braking application by the pilot, types of brakes on the aircraft, and the actual runway condition are directly related and contributing factors that impact the life of the wheels and brake pads. For example, when the runway condition is wet, the braking action of the aircraft would be poor for the same brake pressure applied when the runway condition is good/normal.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE INVENTION

According to certain aspects of the disclosure, systems and methods are disclosed for providing accurate real-time condition of an airport runway.

According to certain aspects of the disclosure, computer-implemented methods are disclosed for validating a real-time condition of a landing field using aircraft data, the method comprising: identifying a plurality of segments of the runway based on a configurable parameter; receiving input data of at least one of a reported runway condition code and a reported braking action of a recently landed aircraft; receiving actual data of an actual runway deceleration profile from the recently landed aircraft for each identified segment of the runway; creating expected data of an expected runway deceleration profile based on the received input data and the received actual data; comparing the received actual data with the created expected data to validate and/or reassess the input data; and transmitting the validated and/or reassessed data to at least one of other approaching aircraft and an airport controller.

According to certain aspects of the disclosure, systems are disclosed for validating a real-time condition of a landing field using aircraft data, comprising: a memory having processor-readable instructions therein; and at least one processor configured to access the memory and execute the processor-readable instructions, which when executed by the processor configures the processor to perform a plurality of functions, including functions for: identifying a plurality of segments of the runway based on a configurable parameter; receiving input data of at least one of a reported runway condition code and a reported braking action for a landing aircraft; receiving actual data of an actual runway deceleration profile from the landing aircraft for each identified segment of the runway; creating expected data of an expected runway deceleration profile based on the received input data and the received actual data; comparing the received actual data with the created expected data to validate and/or reassess the input data; and transmitting the validated and/or reassessed data to at least one of other approaching aircraft and an airport controller.

BRIEF DESCRIPTION OF THE DRAWINGS

Embodiments of the invention will now be described, by way of example only, with reference to the accompanying drawings in which.

DETAILED DESCRIPTION

Figure 1:
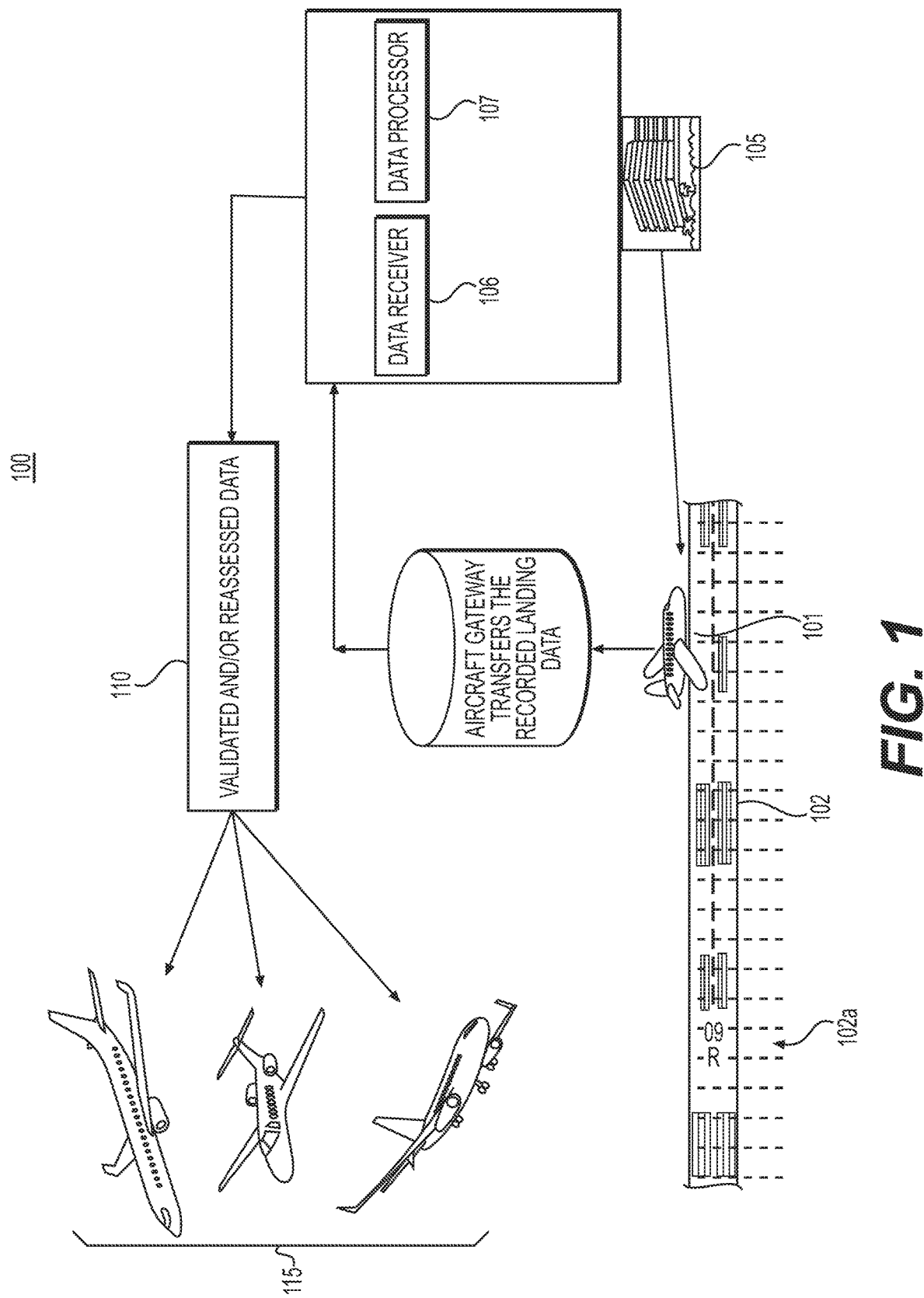
FIG. 1 depicts an exemplary embodiment of a system for validating a real-time condition of a landing field using aircraft data, according to aspects of the present disclosure.

The following embodiments describe systems and methods for validating a real-time condition of a landing field using aircraft data.

Subject matter of the present disclosure will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

As described above, in order to optimize and increase safety and the life of the wheels and brakes of an aircraft, it is desirable for the pilot to understand the exact real-time condition of the runway over its entire length. However, it would be difficult for the pilot to manually monitor the condition of the runway and execute a proper braking application. Moreover, manual monitoring of the runway condition may compromise safety. Existing systems involve exhaustive sensors and other devices to sense and provide the runway data over the entire length of the runway to display in the cockpit system for better situational awareness for the pilot. These systems do not provide clear and concrete solutions in terms of how much brake pressure is needed to stop at a certain point on the runway. Therefore, there is a need for automatic validation and/or reassessment of the RWYCC and braking action in real-time and to share the validated and/or reassessed RWYCC and braking action with other approaching aircraft and the airport controller. Having the most accurate real-time condition of the runway will help the other approaching pilots apply the optimal braking pressure throughout the entire length of the runway depending on the actual runway condition.

Referring now to the appended drawings, FIG. 1 shows an exemplary embodiment of a system 100 for validating a real-time condition of a landing field using aircraft data, and for providing accurate real-time runway condition data to other approaching aircraft 115 and an airport controller. In general, FIG. 1 depicts recently landed aircraft 101, runway 102, server 105, validated and/or reassessed data 110, and approaching aircraft 115.

As shown in FIG. 1, when an aircraft 101 lands on a runway 102, data is recorded during landing and may be transferred to a server 105 when landing is complete. The server 105 includes a data receiver 106 and a data processor 107. Data receiver 106 receives the landing data and data processer 107 identifies a plurality of segments 102a of runway 102 based on a configurable parameter. The configurable parameter may be any positive integer up to the full length of runway 102. For example, if the configurable parameter is 100 ft. and runway 102 is 3,000 ft., data processor 107 may identify thirty (30) runway segments 102a, each runway segment being 100 ft.

Data processor 107 further compares actual data with expected data (referenced with respect to FIG. 2 below as data "210" and "215," respectively) to validate and/or reassess braking action data and RWYCC data (referenced with respect to FIG. 2 below as data "206" and "207," respectively) for each segment 102a of runway 102, as further discussed below. The data processor 107 may comprise any desired avionics equipment onboard aircraft 101 or may be part of an on-ground system, such as server 105, as depicted in FIG. 1. The validated and/or reassessed data 110 may then be transmitted to the airport controller and other approaching aircraft 115 so that approaching pilots can apply the optimal brake pressure for the actual real-time condition at each segment 102a of runway 102. Further objectives and advantages of system 100 will become apparent from the description below.

Figure 2:
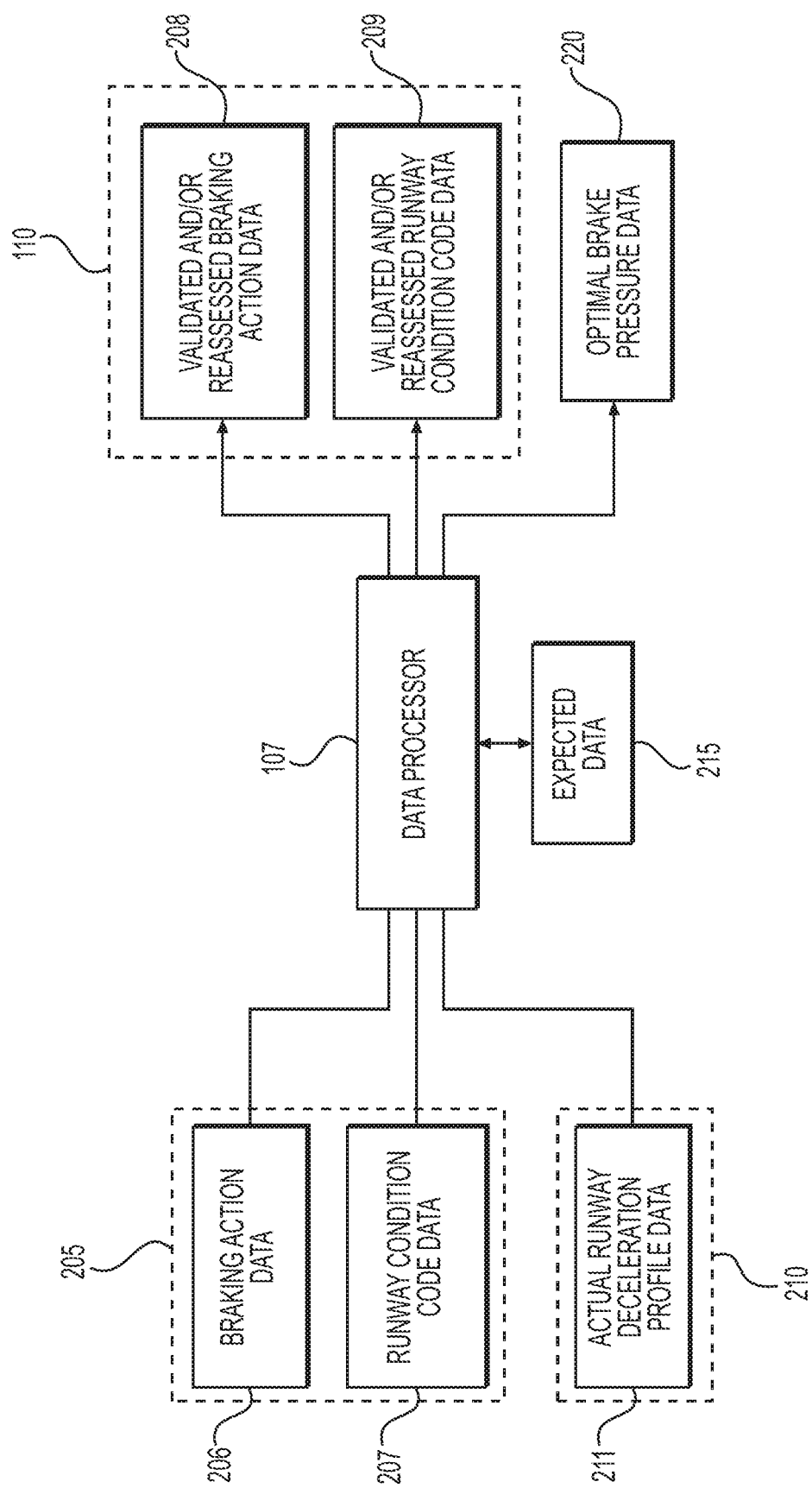
FIG. 2 depicts an input/output block diagram of an exemplary embodiment of a data processer for validating a real-time condition of a landing field using aircraft data, according to aspects of the present disclosure.

FIG. 2 is an input/output block diagram of an exemplary embodiment data processor 107 for validating a real-time condition of a landing field using aircraft data, and for providing accurate real-time runway condition data to other approaching aircraft 115 and an airport controller, according to the present disclosure. In general, FIG. 2 depicts data processor 107, input data 205, actual data 210, expected data 215, and validated and/or reassessed data 110.

As shown in FIG. 2, data processor 107 receives input data 205 and actual data 210. Input data 205 may include braking action data 206 from a pilot report and/or Runway Condition Code (RWYCC) data 207 from an airport controller. As mentioned above, braking action data 206 may be reported by a recently landed pilot as a pilot information report (PIREP). The PIREP may contain information from the pilot or aircrew of how easily recently landed aircraft 101 stopped after landing on runway 102. In other words, the pilot may report the amount of brake pressure applied for the reported RWYCC. For example, the braking action data 206 may be reported as any of the following terms: "Good," "Medium," or "Poor," or any other industry standard characterization. If the landing pilot experiences a normal deceleration for the wheel braking effort applied and directional control is normal, then he/she may report the braking action as "Good." If the landing pilot experiences a noticeably reduced braking deceleration for the wheel braking effort applied or directional control is noticeable reduced, then he/she may report the braking action as "Medium." If the landing pilot experiences a significantly reduced braking deceleration for the wheel braking effort applied or directional control is significantly reduced, then he/she may report the braking action as "Poor." The reported braking action may also be in between Good, Medium, and Poor. For example, the braking action may be reported as "Good to Medium" or "Medium to Poor" as well. If the braking deceleration is minimal to non-existent for the wheel braking effort applied or directional control is uncertain, the pilot may report the braking action as "Nil." Thus, the braking action data 206 is entered into the data processor 107 and stored for validation and/or reassessment by the data processor 107, as described below.

RWYCC data 207 may be obtained with the assistance of ground equipment that measures the runway condition and is reported as a numerical value by an airport controller. As described above, the airport controller may access a standardized Runway Condition Assessment Matrix (RCAM) to perform assessments of runway conditions. The RCAM provides numerical values (between 0-6) for various runway condition descriptions. For example, if the runway condition is assessed to be dry, the RWYCC is "6," and if the runway condition is assessed to be covered with ice, the RWYCC is "1." Thus, the RWYCC data 207 may be entered into the data processor 107 and stored for validation and/or reassessment by the data processor 107, as described below. The braking action data 206 and the RWYCC data 207 may be compared against each other and if there are differences, Once the braking action data 206 and RWYCC data 207 are collected, The braking action data 206, collected from various pilots of a plurality of recently landed aircraft 101, may then be compared to the RWYCC data 207. If the various pilots of the plurality of recently landed aircraft 101 all report the braking action data 206 as the same braking action, but the reported RWYCC data 207 is different than the reported braking action data 206, then data processor 107 may transmit a caution signal to the other approaching aircraft 115 and/or the airport controller. For example, if all of the pilots of various recently landed aircraft 101 report the braking action as "Poor" and the current RWYCC is "6," then data processor 107 may transmit a caution signal to the airport controller to inform the airport controller that the runway condition may actually be poor. If there are inconsistencies in reported braking action data 206 reported by the pilots of various recently landed aircraft 101, then data processor 107 may compare the reported braking action data 206 and RWYCC data 207 with actual 210 and expected data 215, as further described below.

Actual data 210 may be obtained by data processor 107 and may include actual runway deceleration profile data 211 at each segment 102a of runway 102. Actual runway deceleration profile data 211 may be obtained from at least one of an onboard flight management system (FMS) and a quick access recorder (QAR) which may record the runway deceleration profile while aircraft 101 is landing on runway 102. The actual runway deceleration profile data 211 may include data about the aircraft 101 touch down point and stop point on runway 102, as well as speed of aircraft 101 and the brake pressure applied at each segment 102a of runway 102. Actual data 210 may further include external wind speed and direction and other relevant landing information, such as power settings, type of aircraft (e.g. B737), and the mass of aircraft 101 at the time of landing.

After the data processor 107 receives input data 205 and actual data 210, it may then create and store expected data 215. Expected data 215 may include the expected runway deceleration profile of the landing aircraft 101. To create expected data 215, data processor 107 may access an aircraft database that includes expected aircraft performance data for various runway conditions for a given type of aircraft. Data processor 107 may access the aircraft database through a network or the aircraft database may be stored directly in data processor 107. Data processor 107 may use the input data 205 of braking action data 206 and RWYCC data 207 to determine a reported current runway condition. From the reported current runway condition, data processor 107 may determine the expected runway deceleration profile based on the aircraft database for the type of aircraft 101 that landed. For example, if the landed pilot reports the braking action as "Good" and the airport controller reports the RWYCC as "6," the data processor 107 may determine that the reported current runway condition is "Dry." The data processor 107 may then access the aircraft database for the type of aircraft 101 (e.g., B737) making its landing and lookup the expected runway deceleration profile for the reported current runway condition for that type of aircraft. The data processor 107 may then create expected data 215 of the expected runway deceleration profile, which is then used to compare to actual data 210 to validate and/or reassess the input data 205.

FIG. 2 further shows that the data processor 107 validates and/or reassesses both the braking action data 206 and the RWYCC data 207. In order to validate and/or reassess the input data 205, the data processor 107 compares the actual data 210 with the expected data 215. In other words, the data processor 107 compares the actual runway deceleration profile data 211 with the expected runway deceleration profile obtained from the aircraft database for the reported current runway condition. For each of the braking action data 206 and RWYCC data 207, if the actual runway deceleration profile data 211 matches, or closely matches, the expected runway deceleration profile, then the braking action data 206 and/or the RWYCC data 207 may be validated. Conversely, if the actual runway deceleration profile data 211 does not match the expected runway deceleration profile, then the braking action data 206 and RWYCC data 207 may be reassessed (i.e., modified to reflect the actual current condition of the runway). Using the example from above, for a reported "dry" runway 102, if the actual runway deceleration profile data 211 is less than the expected runway deceleration profile for the respective reported runway condition, than the actual runway condition is less than "dry." Based on the comparison, the data processor 107 may reassess the braking action data 206 and the RWYCC data 207 to reflect the actual runway condition for each segment 102a. In this scenario, data processor 107 would reassess the braking action data 206 to be either "Medium" or "Poor" and the RWYCC data 207 would be reassessed to a respective numerical value less than "6." The data processor 107 may perform this validation and/or reassessment of the braking action data 206 and RWYCC data 207 for each segment 102a of runway 102 and store the new data as validated and/or reassessed braking action data 208 and validated and/or reassessed RWYCC data 209. Collectively, the validated and/or reassessed braking action data 208 and the validated and/or reassessed RWYCC data 209 constitutes validated and/or reassessed data 110. The data processor 107 may also calculate an optimal brake pressure data 220 of the optimal braking application for each segment 102a, based on the validated and/or reassessed data 110.

The data processor 107 may then transmit the validated and/or reassessed data 110 to at least one of other approaching aircraft 115 and the airport controller, respectively. For example, the validated and/or reassessed braking action data 208 may be transmitted to other approaching aircraft 115 and the validated and/or reassessed RWYCC data 209 may be transmitted to the airport controller. The data processor 107 may also transmit the recommended optimal brake pressure data 220 to the other approaching aircraft 115 for the approaching pilots to use while landing. Transmitting the validated and/or reassessed data 110 to other approaching aircraft 115 and the airport controller may provide accurate and real-time condition of runway 102 as well as a more accurate estimate of optimal brake pressure. This may reduce runway excursion and may ensure longevity of the brake pads for landing aircraft.

Figure 3:
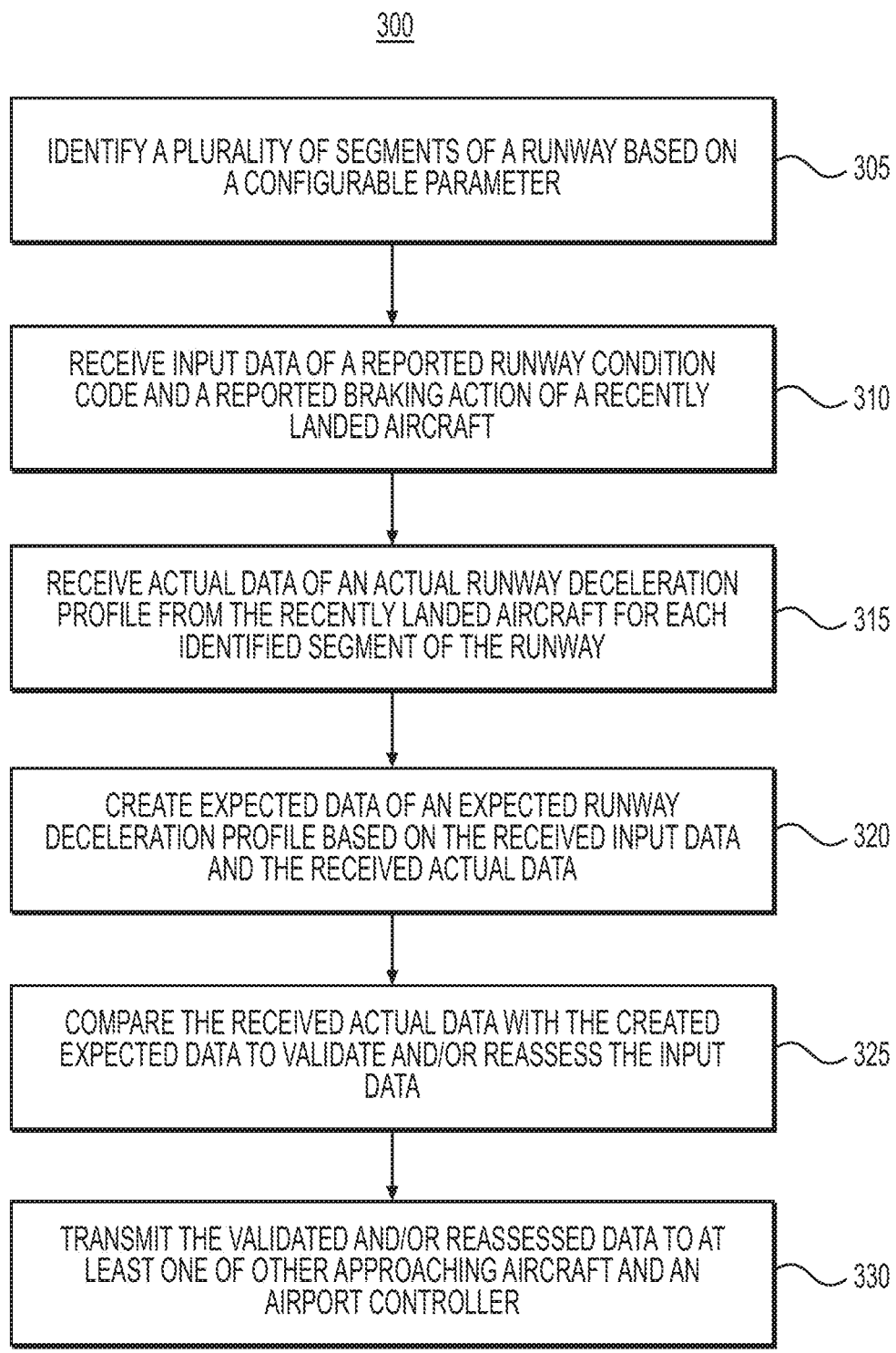
FIG. 3 depicts a flowchart illustrating an exemplary method for validating a real-time condition of a landing field using aircraft data, according to aspects of the present disclosure.

FIG. 3 is a flowchart illustrating an exemplary method 300 for validating a real-time condition of a landing field using aircraft data, consistent with embodiments of the current disclosure. In one embodiment, the method may comprise identifying a plurality of segments of a runway based on a configurable parameter (Step 305). For example, in one embodiment data processor 107 may identify a plurality of segments 102a of the runway 102 based on the configurable parameter. The configurable parameter may be a predetermined length (e.g. 100 ft.) in which the runway 102 is segmented by the data processor 107 in order to provide a runway condition for each segment 102a. Providing a runway condition for each segment 102a allows for an optimized braking action by other approaching aircraft 115 because the runway 102 may have different contaminants in the different segments 102a. For example, one segment 102a may be "Dry" and another segment 102a may be "Wet" and different braking pressures may need to be applied at each segment 102a.

In one embodiment, the method may then comprise receiving input data of a reported runway condition code and/or braking action data from a previously landed aircraft/pilot (Step 310). For example, in one embodiment, data processor 107 then receives input data 205, as described above, of RWYCC data 207 from the airport controller and/or, if available, braking action data 206 from a previously landed pilot.

In one embodiment, the method may then comprise receiving actual data of an actual runway deceleration profile from recently landed aircraft 101 (Step 315). For example, in one embodiment, the data processor 107 also receives actual data 210 from the landed aircraft 101. The actual data 210 may comprise actual runway deceleration profile data 211 of the landed aircraft 101 for each identified segment 102a of the runway 102. The actual runway deceleration profile data 211 is recorded by at least one of an onboard flight management system (FMS) and a quick access recorder (QAR). The actual data 210 of the actual runway deceleration profile data 211 may be obtained from both the recorded deceleration of the aircraft 101 and the brake pressure applied by the pilot of the landed aircraft 101 through each runway segment 102a.

In one embodiment, the method may then comprise creating expected data of an expected runway deceleration profile based on the received input data and the received actual data (Step 320). For example, in one embodiment, data processor 107 may then create expected data 215 of an expected runway deceleration profile based on the received input data 205 and the received actual data 210. To create expected data 215, data processor 107 can access the aircraft database and determine the expected runway deceleration profile for the type of recently landed aircraft 101 and the reported contaminant type and depth. The reported contaminant type and depth is obtained from the input data 205 of the reported braking action data 206 and the reported RWYCC data 207.

In one embodiment, the method may then comprise comparing the received actual data to the expected data in order to validate and/or reassess the input data (Step 325). For example, in one embodiment, the data processor 107 then compares the actual data 210 to the expected data 215 in order to validate and/or reassess the input data 205. If the actual data 210 of the actual runway deceleration profile 211 and the applied brake pressure matches the expected data 215, then the RWYCC data 207 is validated and the RWYCC data 207 is not modified. If, however, the actual runway deceleration profile 211 of the aircraft is different than the expected runway deceleration profile, then the RWYCC data 207 is reassessed and may be modified by the airport controller. Similarly, the braking action data 206 may be validated and/or reassessed as well.

In one embodiment, the method may then comprise transmitting the validated and/or reassessed data to at least one of other approaching aircraft or the airport controller (Step 330). For example, the validated and/or reassessed data 110 may then be transmitted to at least one of other approaching aircraft 115 or the airport controller. For example, the validated and/or reassessed braking action data 208 may be transmitted to other approaching aircraft 115. The optimal brake pressure data 220 may also be transmitted to the other approaching aircraft 115 for the other approaching pilots to utilize while landing so that the other approaching pilots and aircrew can apply the optimal braking pressure at each segment 102a. Likewise, the validated and/or reassessed RWYCC data 209 may be transmitted to the airport controller in order to modify the RWYCC, if desired.

The following scenario further illustrates how data processor 107 may compare the actual data 210 with the expected data 215:

In a 3,000 ft. runway, data processor 107 identifies thirty segments, each being 100 ft., and the RWYCC is reported as DRY. However, data processor 107 notes a mismatch in two different segments 102a:

a. Segment 6: Between 500 ft. and 600 ft., with the given brake pressure applied by the pilots, the aircraft deceleration was much less than the desired/required deceleration, −2 kts compared to −10 kts. This comparison revealed that the actual friction on Segment 6 is less than expected based on the reported RWYCC. This reassessed and accurate data could be transmitted to the other approaching pilots 115 and the airport controller to update the RWYCC.

b. Segment 20: Between 1,900 ft. and 2,000 ft., the aircraft decelerated to almost 2 kts against the expected speed of 20 kts. This comparison revealed that the actual friction on Segment 20 is more than expected based on the reported RWYCC for the actual brake pressure applied.

In this scenario, in Segment 6, the aircraft did not decelerate as much as expected, and therefore for that segment, the runway condition was not actually DRY, as reported. Further, in Segment 20, the aircraft decelerated faster than expected for the given brake pressure, which revealed that the brake pressure applied did not need to be as much. This information could prove useful to other approaching aircraft 115 in order to apply the optimal amount of brake pressure for each segment 102a.

In conventional landing systems, the Flight Management System (FMS) Takeoff and Landing Data (TOLD) is designed to perform computation of takeoff and landing performance data. Using inputs from the onboard aircraft systems, as well as a minimal amount of pilot inputs, TOLD computes take-off and landing requirements, such as: V-speeds, field length requirements, landing ground roll, obstacle clearance and engine/aircraft limits. The FMS takeoff and landing initialization requires pilot entry of runway condition data. As mentioned above, typical selections are Good (dry), Medium (wet), or Poor (icy) and are manually selected by the pilot. By using the accurate and real-time information of the runway condition and braking action calculated using the system 100, the FMS TOLD computations can be performed more accurately, which ensures safer landings and longer life of the brake pads.

Figure 4:
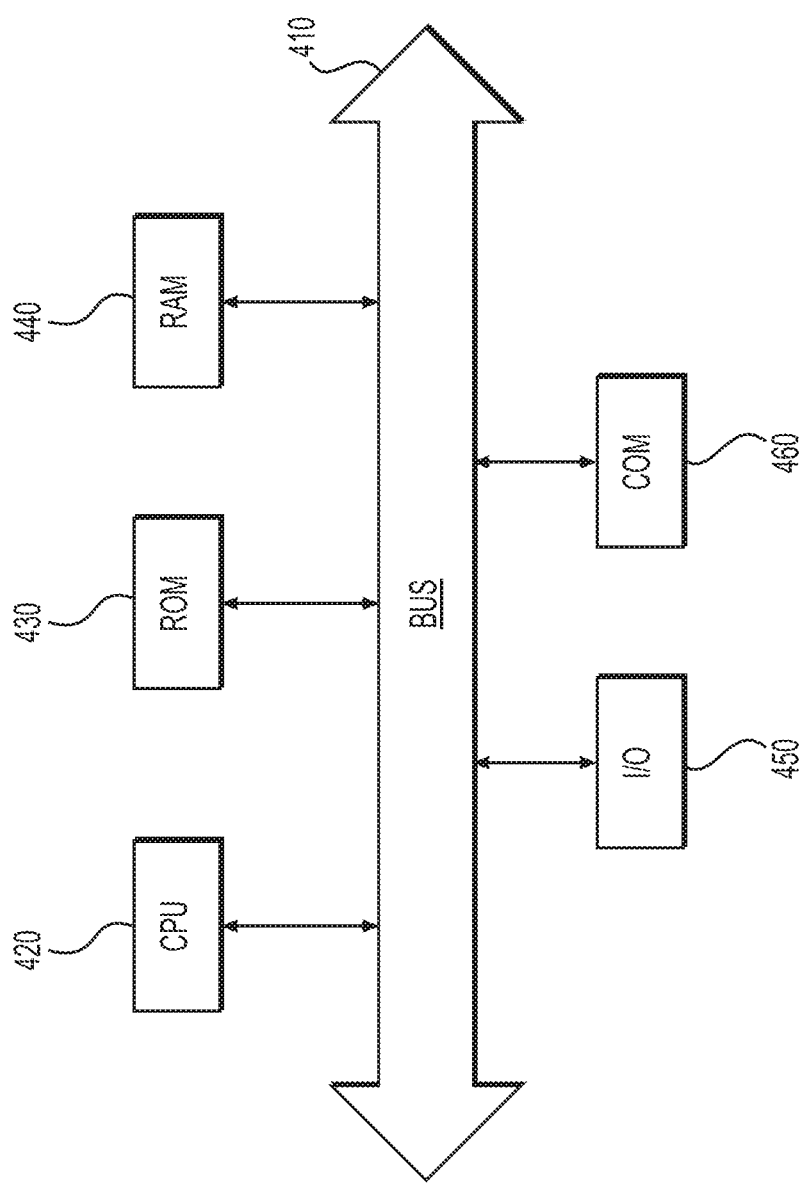
FIG. 4 depicts an exemplary device in which one or more embodiments of the present disclosure may be implemented.

FIG. 4 illustrates a high-level functional block diagram of an exemplary device 400, in which embodiments of the present disclosure, or portions thereof, may be implemented, e.g., as computer-readable code. For example, each of the exemplary systems, devices, and methods described above with respect to FIGS. 1-3 can be implemented in device 400 using hardware, software, firmware, tangible computer readable media having instructions stored thereon, or a combination thereof and may be implemented in one or more computer systems or other processing systems. Hardware, software, or any combination of such may implement each of the exemplary systems, devices, and methods described above with respect to FIGS. 1-3.

As shown in FIG. 4, device 400 may include a central processing unit (CPU) 420. CPU 420 may be any type of processor device including, for example, any type of special purpose or a general purpose microprocessor device. As will be appreciated by persons skilled in the relevant art, CPU 420 also may be a single processor in a multi-core/multi-processor system, such system operating alone, or in a cluster of computing devices operating in a cluster or server farm. CPU 420 may be connected to a data communication infrastructure 410, for example, a bus, message queue, network, or multi-core message-passing scheme.

Device 400 may also include a main memory 440, for example, random access memory (RAM), and may also include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into device 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 400.

Device 400 may also include a communications interface ("COM") 460. Communications interface 460 allows software and data to be transferred between device 400 and external devices. Communications interface 460 may include a modem, a network interface (such as an Ethernet card), a communications port, a PCMCIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of device 400, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for validating a real-time condition of a landing field using aircraft data, the method comprising:
   identifying a plurality of segments of the runway based on a configurable parameter;
   receiving input data of at least one of a reported runway condition code and a reported braking action of a recently landed aircraft;
   receiving actual data of an actual runway deceleration profile from the recently landed aircraft for each identified segment of the runway;
   creating expected data of an expected runway deceleration profile based on the received input data and the received actual data;
   comparing the received actual data with the created expected data to validate and/or reassess the input data; and
   transmitting the validated and/or reassessed data to at least one of other approaching aircraft and an airport controller.

2. The method of claim 1, wherein the configurable parameter is a predetermined length of the runway up to an entire length of the runway.

3. The method of claim 1, wherein receiving input data comprises receiving the reported runway condition code from an airport controller and receiving the reported braking action from a previously landed pilot or aircraft.

4. The method of claim 1, wherein receiving actual data further comprises receiving data, at the time of landing, of at least one of the aircraft type, a mass of the aircraft, external wind speed and direction, and power settings.

5. The method of claim 4, wherein creating the expected data comprises accessing an aircraft database to determine the expected runway deceleration profile for the aircraft type based on aircraft performance data in the aircraft database for a respective reported contaminant type and depth.

6. The method of claim 5, wherein the data processor determines the reported contaminant type and depth based on the reported runway condition code and the reported braking action.

7. The method of claim 1, wherein comparing the received data with the expected data further comprises comparing the actual runway deceleration profile with the expected runway deceleration profile.

8. The method of claim 7, wherein if the actual runway deceleration profile matches, or substantially matches, the expected runway deceleration profile, then the input data is validated; and
   wherein if the actual runway deceleration profile is different than the expected runway deceleration profile, then the input data is reassessed.

9. The method of claim 1, further comprising creating optimal brake pressure data of the optimal brake pressure to be applied at each segment of the runway.

10. The method of claim 9, wherein transmitting the validated and/or reassessed data further comprises transmitting the validated and/or reassessed runway condition code to the airport controller; and
    transmitting the optimal brake pressure data and the validated and/or reassessed braking action data to the other approaching aircraft.

11. A system for validating a real-time condition of a landing field using aircraft data, comprising:
    a memory having processor-readable instructions therein; and
    at least one processor configured to access the memory and execute the processor-readable instructions, which when executed by the processor configures the processor to perform a plurality of functions, including functions for:
    identifying a plurality of segments of the runway based on a configurable parameter;
    receiving input data of at least one of a reported runway condition code and a reported braking action for a landing aircraft;
    receiving actual data of an actual runway deceleration profile from the landing aircraft for each identified segment of the runway;
    creating expected data of an expected runway deceleration profile based on the received input data and the received actual data;
    comparing the received actual data with the created expected data to validate and/or reassess the input data; and transmitting the validated and/or reassessed data to at least one of other approaching aircraft and an airport controller.

12. The system of claim 11, wherein the configurable parameter is a predetermined length of the runway up to the entire length of the runway.

13. The system of claim 11, wherein receiving input data comprises receiving the reported runway condition code from an airport controller and receiving the reported braking action a previously landed pilot.

14. The system of claim 11, wherein receiving actual data further comprises receiving data, at the time of landing, of at least one of the aircraft type, a mass of the aircraft, external wind speed and direction, and power settings.

15. The system of claim 14, wherein creating the expected data comprises accessing an aircraft database to determine the expected runway deceleration profile for the aircraft type based on aircraft performance data in the aircraft database for a respective reported contaminant type and depth.

16. The system of claim 15, wherein the data processor determines the reported contaminant type and depth based on the reported runway condition code and the reported braking action.

17. The system of claim 11, wherein comparing the received data with the expected data further comprises comparing the actual runway deceleration profile with the expected runway deceleration profile.

18. The system of claim 17, wherein if the actual runway deceleration profile matches, or substantially matches, the expected runway deceleration profile, then the input data is validated; and wherein if the actual runway deceleration profile is different than the expected runway deceleration profile, then the input data is reassessed.

19. The system of claim 11, further comprising creating optimal brake pressure data of the optimal brake pressure to be applied at each segment of the runway.

20. The system of claim 19, wherein transmitting the validated and/or reassessed data further comprises transmitting the validated and/or reassessed runway condition code to the airport controller; and transmitting the optimal brake pressure data and the validated and/or reassessed braking action data to the other approaching aircraft.

* * * * *